US011268725B2

(12) United States Patent
Chen et al.

(10) Patent No.: US 11,268,725 B2
(45) Date of Patent: Mar. 8, 2022

(54) CONDITION BASED ENERGY SMART AIR CIRCULATION SYSTEM

(71) Applicants: Lei Chen, South Windsor, CT (US); Carrier Corporation, Jupiter, FL (US)

(72) Inventors: Lei Chen, South Windsor, CT (US); Jianwei Zhao, Shanghai (CN); Sanming Wen, Shanghai (CN); Peter Johannes McKinney, Boulder, CO (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 119 days.

(21) Appl. No.: 16/629,880

(22) PCT Filed: Jul. 10, 2017

(86) PCT No.: PCT/CN2017/092336
§ 371 (c)(1),
(2) Date: Jan. 9, 2020

(87) PCT Pub. No.: WO2019/010603
PCT Pub. Date: Jan. 17, 2019

(65) Prior Publication Data
US 2020/0141604 A1   May 7, 2020

(51) Int. Cl.
*F24F 11/74* (2018.01)
*F24F 11/39* (2018.01)
(Continued)

(52) U.S. Cl.
CPC .............. *F24F 11/47* (2018.01); *F24F 11/39* (2018.01); *F24F 11/58* (2018.01); *F24F 11/64* (2018.01);
(Continued)

(58) Field of Classification Search
CPC .. F24F 11/39; F24F 11/46; F24F 11/47; F24F 11/58; F24F 11/64; F24F 11/65;
(Continued)

(56) References Cited

U.S. PATENT DOCUMENTS 3,949,810 A   4/1976  Cobb
5,279,609 A   1/1994  Meckler
(Continued)

FOREIGN PATENT DOCUMENTS

CN   101526255 A   9/2009
CN   101782258 A   7/2010
(Continued)

OTHER PUBLICATIONS

European Search Report for Application No. 17917262.2; dated Jan. 21, 2021; 10 Pages.
(Continued)

*Primary Examiner* — Kidest Bahta
(74) *Attorney, Agent, or Firm* — Cantor Colburn LLP

(57) ABSTRACT

A method for improving the effectiveness of a building air circulation system having motorized blower and a contamination filter. The method including predicting a cost of operation of the system over an operational duration based on at least electricity consumption of the motor (115), and an operational cost to operate the filter (148), predicting a cost of maintenance of the system over the operational duration based on at least one of, a condition of the filter (148), a cost of a filter (148), a cost of labor to clean or replace the filter (148), and an effectiveness of the filter (148) over the operational duration, and balancing the cost of operation of the circulation system versus the cost of maintenance of the circulation system over the duration to recommend at least one of a filter use/bypass schedule, a filter maintenance
(Continued)

schedule, and a fresh air input schedule satisfying an operation objective and an operational constraint.

10 Claims, 4 Drawing Sheets

(51) Int. Cl.
| | | |
|---|---|---|
| *F24F 11/47* | (2018.01) | |
| *F24F 11/64* | (2018.01) | |
| *F24F 11/65* | (2018.01) | |
| *F24F 11/58* | (2018.01) | |
| *G05B 19/042* | (2006.01) | |
| *F24F 110/50* | (2018.01) | |
| *F24F 130/00* | (2018.01) | |
| *F24F 110/52* | (2018.01) | |
| *F24F 11/00* | (2018.01) | |

(52) U.S. Cl.
CPC .............. *F24F 11/65* (2018.01); *F24F 11/74* (2018.01); *G05B 19/042* (2013.01); *F24F 2011/0002* (2013.01); *F24F 2110/50* (2018.01); *F24F 2110/52* (2018.01); *F24F 2130/00* (2018.01); *G05B 2219/2614* (2013.01)

(58) Field of Classification Search
CPC .............. F24F 11/74; F24F 2011/0002; F24F 2110/40; F24F 2110/50; F24F 2110/52; F24F 2110/64; F24F 2130/00; G05B 19/042; G05B 2219/2614; Y02B 30/70; B01D 46/0086
See application file for complete search history.

(56) References Cited

U.S. PATENT DOCUMENTS

| | | | |
|---|---|---|---|
| 5,590,830 A | | 1/1997 | Kettler et al. |
| 5,707,005 A | | 1/1998 | Kettler et al. |
| 5,742,516 A | | 4/1998 | Olcerst |
| 6,698,219 B2 | | 3/2004 | Sekhar et al. |
| 6,790,136 B2 | | 9/2004 | Sharp et al. |
| 7,025,281 B2 | | 4/2006 | Deluca |
| 7,222,494 B2 | | 5/2007 | Peterson et al. |
| 7,434,413 B2 | | 10/2008 | Wruck |
| 7,918,407 B2 | | 4/2011 | Patch |
| 8,086,407 B2 | | 12/2011 | Chan et al. |
| 8,160,729 B2 | | 4/2012 | Ahmed |
| 9,109,981 B2 | | 8/2015 | Sharp |
| 9,188,508 B1 | | 11/2015 | Meyer |
| 9,328,936 B2 | | 5/2016 | Meirav et al. |
| 9,535,407 B2 | | 1/2017 | Durham et al. |
| 9,593,861 B1 | | 3/2017 | Burnett |
| 10,302,325 B1* | | 5/2019 | Osborne .................. F24F 11/30 |
| 2005/0247194 A1* | | 11/2005 | Kang .................. B01D 46/444 |
| | | | 95/19 |
| 2006/0162552 A1 | | 7/2006 | Yost et al. |
| 2008/0014857 A1 | | 1/2008 | Spadafora et al. |
| 2009/0143915 A1 | | 6/2009 | Dougan et al. |
| 2011/0172828 A1 | | 7/2011 | Schmidt et al. |
| 2013/0061659 A1 | | 3/2013 | Ajay et al. |
| 2013/0179373 A1* | | 7/2013 | Mutchnik ............ F24F 11/0001 |
| | | | 705/412 |
| 2013/0345995 A1* | | 12/2013 | Shah .................... G01R 21/133 |
| | | | 702/47 |
| 2014/0365017 A1 | | 12/2014 | Hanna et al. |
| 2014/0370800 A1 | | 12/2014 | Ansari |
| 2016/0305678 A1 | | 10/2016 | Pavlovski et al. |
| 2017/0286572 A1* | | 10/2017 | Hershey ............. G05B 23/0283 |

FOREIGN PATENT DOCUMENTS

| | | |
|---|---|---|
| CN | 101900394 A | 12/2010 |
| CN | 202166852 U | 3/2012 |
| CN | 103453620 A | 12/2013 |
| CN | 103528167 A | 1/2014 |
| CN | 203518128 U | 4/2014 |
| CN | 104633795 A | 5/2015 |
| CN | 104791963 A | 7/2015 |
| CN | 205158005 U | 4/2016 |
| CN | 205641355 U | 10/2016 |
| CN | 106288195 A | 1/2017 |
| CN | 106440029 A | 2/2017 |
| CN | 106678992 A | 5/2017 |
| DE | 9218079 U1 | 7/1993 |
| DE | 202006017176 U1 | 2/2007 |
| JP | 2015034683 A | 2/2015 |
| KR | 20150025761 A | 3/2015 |
| SE | 537506 A | 5/2015 |
| WO | 2011163638 A1 | 12/2011 |
| WO | 2015151011 A1 | 10/2015 |
| WO | 2016148651 A1 | 9/2016 |
| WO | 2016210091 A1 | 12/2016 |

OTHER PUBLICATIONS

International Search Report and Written Opinion for application PCT/CN2017/092336, dated Mar. 28, 2018, 10 pages.

* cited by examiner

CONDITION BASED ENERGY SMART AIR CIRCULATION SYSTEM

FIELD OF INVENTION

Embodiments relate generally to air flow control in an HVAC system and, more particularly, to a system and method for improved air flow control algorithms in an air handling unit of a ducted HVAC system that provides more optimized air circulation and filtration system operation and maintenance over the operating range of the air handler in view of indoor air quality, particulate matter management, and operating cost.

DESCRIPTION OF RELATED ART

Modern structures, such as office buildings and residences, utilize heating, ventilation, and cooling (HVAC) systems having controllers that allow users to control the environmental conditions within these structures. These controllers have evolved over time from simple temperature based controllers to more advanced programmable controllers, which allow users to program a schedule of temperature set points in one or more environmental control zones for a fixed number of time periods as well as to control the humidity in the control zones, or other similar conditions. Typically, these HVAC systems use an air handler connected to ducts to deliver conditioned air to an interior space either alone or in combination with fresh air drawn from outside of the building. After the supply air has been heated or cooled, it is then discharged by a fan into the associated air distribution system. In other cases, a fan blows the air through heating and cooling coils and then into the distribution system. These ducts provide a path for air to be drawn from the conditioned space and then returned to the air handler. These duct systems vary in shape, cross section and length to serve the design constraints of a structure. The air handler includes a motor and a fan to move the air through the ducts, conditioning equipment and the space. These air handlers are designed to accommodate the wide range of loading represented by the various duct system designs used in these modern structures.

In addition to providing temperature conditioning of the air, units of this type must also maintain an acceptable level of air quality within the conditioned space. The levels of pollutants such as volatile organic compounds and cigarette smoke which are generated within the building can be controlled by a high capacity filtration system which removes airborne contaminants from the recirculated air. High capacity filtration devices such as mechanical filters, electronic filters, and adsorptive devices can be effective at removing many undesired pollutants, but also can cause a significant pressure drop across the filters particularly as they are used longer and fill with contaminants. In order to compensate for the pressure loss, more fan energy must be utilized, thus significantly increasing the operating costs of the system. Replacement costs of high efficiency filters are higher than replacement costs of lower efficiency media, so action to extend the life of the high efficiency filter will reduce system operating costs. Scheduled maintenance as opposed to filter condition based maintenance can lead to additional labor cost than what can be potentially optimized. Therefore, balancing the cost of operating the system with the costs of maintenance while maintaining desirable air quality conditions is highly desirable.

BRIEF SUMMARY

Described herein in an embodiment is a method for improving the efficiency and/or useful lifetime of an air circulation system in the air handling unit (AHU) a building having blower motor and a contaminant filter. The method includes ascertaining at least one of a differential pressure across the contaminant filter, a particulate matter concentration, and an airflow through the filter, and obtaining a current and/or voltage associated with the operation of the blower motor to produce the airflow. The method also includes predicting a cost of operation of the circulation system with respect to clean air delivery amount or rate over an operational duration based on at least an electrical current associated with the operation of the blower motor, predicting a cost of maintenance of the circulation system over the operational duration based on at least one of the differential pressure across the filter and the particulate matter concentration and airflow, balancing the cost of operation of the circulation system versus the cost of maintenance of the circulation system over the selected operational duration to recommend a filter maintenance schedule suiting operation objectives and constraints set by operators.

Also described herein in an embodiment is a method for improving the effectiveness of a building air circulation system having motorized blower and a contamination filter. The method including predicting a cost of operation of the system over an operational duration based on at least electricity consumption of the motor, and an operational cost to operate the filter, predicting a cost of maintenance of the system over the operational duration based on at least one of, a condition of the filter, a cost of a filter, a cost of labor to clean or replace the filter, and an effectiveness of the filter over the operational duration, and balancing the cost of operation of the circulation system versus the cost of maintenance of the circulation system over the duration to recommend at least one of a filter use/bypass schedule, a filter maintenance schedule, and a fresh air input schedule satisfying an operation objective and an operational constraint.

In addition to one or more of the features described above, or as an alternative, further embodiments may include that at least one of the electricity consumption and the operation condition of the contamination filter is based on one or more of a measured or computed electricity consumption of the blower motor to produce an airflow in the system, a measured or computed electricity consumption of the contamination filter, a total pressure experienced by the blower motor, a differential pressure across the contamination filter, a particulate matter concentration of the air in the circulation system, and the airflow through the contamination filter.

In addition to one or more of the features described above, or as an alternative, further embodiments may include the electricity consumption associated with operation of the blower motor is at least one of a change in consumption over the operational duration and the airflow is an airflow change over the operational duration.

In addition to one or more of the features described above, or as an alternative, further embodiments may include that the airflow is at least one of measured by an airflow sensor and determined based on a combination of predetermined measurements and a system operational characteristic.

In addition to one or more of the features described above, or as an alternative, further embodiments may include that the airflow is identified by at least one of a signal provided by the motor, a look up table, and equation or formula, and previously established testing and empirical data for a given air handler configuration; and the operating characteristic is indicative of the speed of the motor.

In addition to one or more of the features described above, or as an alternative, further embodiments may include that the differential pressure provides an indication of a level contamination of the contamination filter.

In addition to one or more of the features described above, or as an alternative, further embodiments may include that the particulate concentration provides an indication of the particulate concentration in the air circulation system.

In addition to one or more of the features described above, or as an alternative, further embodiments may include that the airflow is at least one of measured by an airflow sensor and determined based on predetermined measurements and at least one system operational characteristic.

In addition to one or more of the features described above, or as an alternative, further embodiments may include that the air circulation system further includes at least one of heating, ventilation, and cooling.

In addition to one or more of the features described above, or as an alternative, further embodiments may include that the air flow is identified by at least one of a signal provided by the motor, a look up table, and equation or formula and the operating characteristic is indicative of the speed of the motor.

In addition to one or more of the features described above, or as an alternative, further embodiments may include that the desired airflow is based on previously established testing and empirical data for a given air handler configuration.

In addition to one or more of the features described above, or as an alternative, further embodiments may include that the current associated with the motor is at least one of measured by a controller, estimated in the controller, and communicated by the motor.

In addition to one or more of the features described above, or as an alternative, further embodiments may include that the predicting a cost of operation of the circulation system over the operational duration includes at least one of a cost of the electrical current to operate the blower motor over the operational duration.

In addition to one or more of the features described above, or as an alternative, further embodiments may include that the predicting a cost of maintenance of the circulation system includes at least one of a cost of replacement filters, a cost of labor to replace filters, effectiveness of the filter over the operational duration.

In addition to one or more of the features described above, or as an alternative, further embodiments may include providing fresh air via damper and another blower motor, wherein the predicting a cost of operation of the circulation system over the operational duration further includes at least one of a cost of the electrical current to operate the second blower motor and the damper over the operational duration.

In addition to one or more of the features described above, or as an alternative, further embodiments may include that the balancing is based on weighted indoor air quality metrics.

In addition to one or more of the features described above, or as an alternative, further embodiments may include that providing a visualization to a user or property managers of the building to facilitate modifying constraints on the balancing. Moreover, the visualization may be provided real time or near real time.

Also disclosed herein in an embodiment is a system for enhancing the operation and improving the effectiveness of an air circulation system in a building with in a heating, ventilation, and cooling (HVAC) system in a heating, ventilation, and cooling (HVAC) system. The system includes an air handler including an indoor blower and a motor operably coupled to a duct network, the blower configured to impart airflow to the air in the duct network, a contamination filter operably coupled to the duct network configured to remove contamination from air in the duct network, and at least one of a differential pressure sensor configured to measure a differential pressure across the contamination filter, a particulate concentration sensor configured to determine the presence of particulates in the air in the duct network after the contamination filter, an airflow sensor configured to measure airflow in the duct network. The system also includes an air handler controller in operable communication with at least the motor, the air handler controller configured to provide control commands to operate the motor and a controller in operable communication with the air handler controller and at least one of the differential pressure sensor, the particulate concentration sensor, and an airflow sensor, the controller configured to execute a method for enhancing the operation and improving the efficiency of an air circulation system in a building. The method including predicting a cost of operation of the circulation system over an operational duration based on at least an electricity consumption associated with operation of the blower motor and an operational cost to operate the contamination filter, predicting a cost of maintenance of the circulation system over the operational duration based on at least one of, an operational condition of the contamination filter, a cost of a replacement contamination filter, a cost of labor to clean or replace the contamination filter, and an effectiveness of the contamination filter over the operational duration, and balancing the cost of operation of the circulation system versus the cost of maintenance of the circulation system over the selected operational duration to recommend at least one of a contamination filter use/bypass schedule, a contamination filter maintenance schedule, and a fresh air input schedule satisfying an operation objective and an operational constraint set by an operator.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded of the described embodiments is particularly pointed out and distinctly claimed in the claims at the conclusion of the specification. The foregoing and other features, and advantages of the described embodiments are apparent from the following detailed description taken in conjunction with the accompanying drawings in which

DETAILED DESCRIPTION

Figure 1:
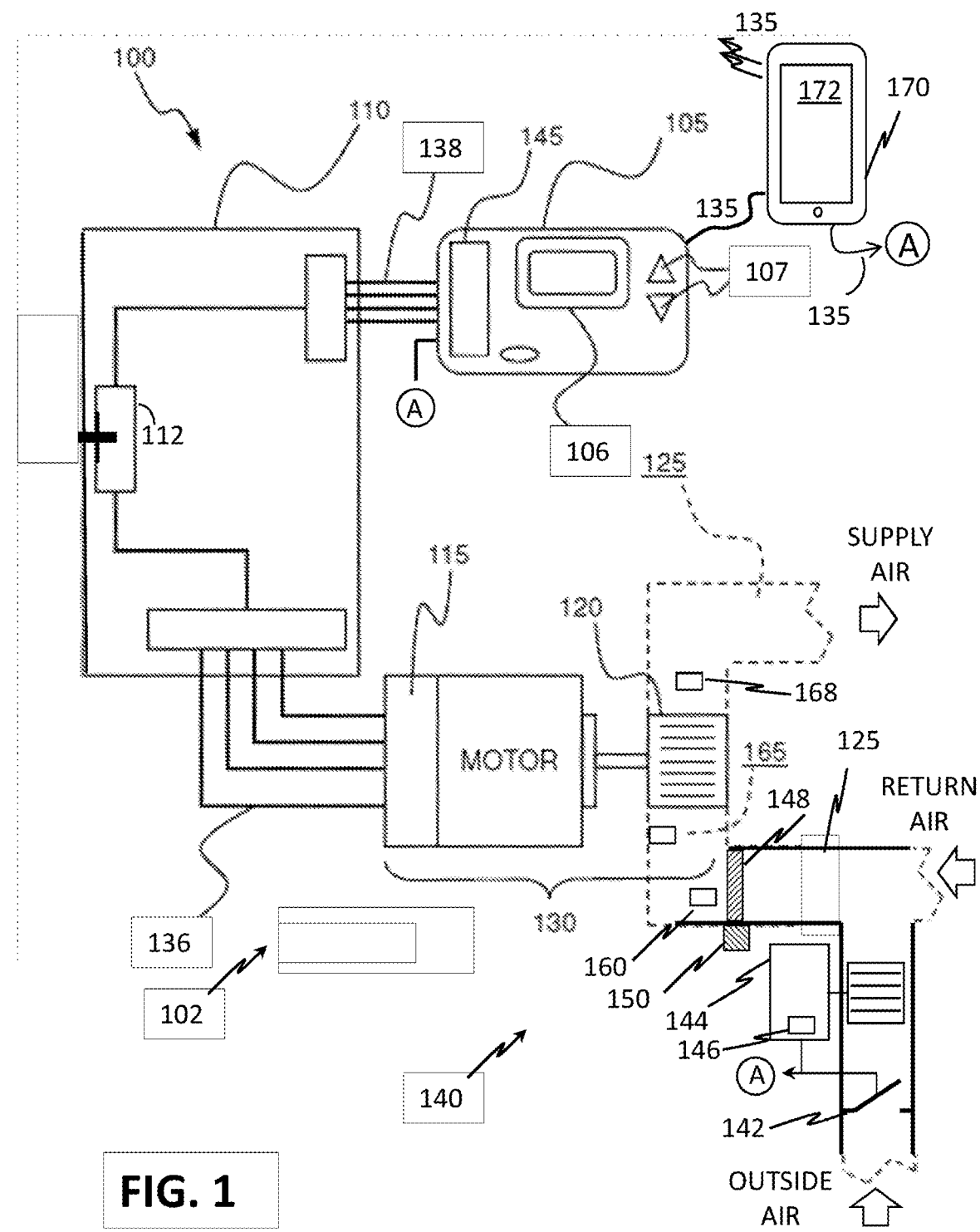
FIG. 1 illustrates a schematic view of an HVAC system including an air handler, system control unit, an air handler control unit, and a user device for implementing and monitoring the method in accordance with an embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

It should be noted that in a typical HVAC system, the air handler refers to the indoor air handling unit that delivers conditioned air directly or through air ducts to various parts of the conditioned space. In one typical system type, the air handler is also referred to as the fan coil unit and includes an indoor blower and motor as well as indoor refrigerant coil to provide cooling or heating in conjunction with an outside air conditioner or heat pump unit. The air handler may also optionally include a supplemental heat source such as an electric strip heater or a hydronic hot water coil and filter media whether mechanical or electronic. In another typical system, the indoor air handler includes or be directly interfaced to a gas furnace unit that also includes an indoor blower and motor, which is capable of delivering heat by combusting a fuel such as natural gas or propane. Embodiments apply to both types of air handler units and are directed to air delivery capabilities, the power consumption of the blower motor and the duct restriction represented by the external static pressure.

Embodiments of an HVAC system include an air circulation and filtration system in or with air handling units or (AHU) equipped with sensors and algorithm to track air filtration efficiency and energy consumption for operating cost optimization while attaining desired indoor air quality (IAQ). In some of the described embodiments a modular system with separable integrable algorithms and associated mechanical filters and differential pressure and particulate matter measurement devices are made as modules to be used in existing AHUs or new equipment. In other words, implemented as new equipment or as a separate aftermarket addition to existing equipment. Energy consumption associated with delivering a required amount of outside air (according to thermal & $CO_2$ control requirements) is calculated in real time based on the pressure drop and air flow rate. These inputs along with particulate sensor readings are used for computing the efficiency of filtration. Any increase in filtration efficiency of a mechanical filter due to clogging is weighed in against maintenance cost of filters, i.e., labor and material costs for replacement, and energy consumption for operation to satisfy pre-set economic constraints. Alternatively, replacement of mechanical filters will be governed by combined outside air (OA) intake requirements, filter cost, replacement cost, and energy cost. Visualization of overall IAQ, energy consumption, filter efficiency & effectiveness can be made available while the filtration system operates autonomously.

Referring now to the drawings, FIG. 1 illustrates a schematic view of an HVAC system 100 with an air handler shown generally as 102. Particularly, the HVAC system 100 includes a system control unit 105, an air handler 102 and an air handler controller 110, and a blower system 130 (as part of an air handler 102) having a fixed or variable speed motor 115 and a centrifugal blower 120 connected to the duct system 125. While a centrifugal blower 120 is shown in an embodiment, it should be readily appreciated that any kind of blower or fan maybe employed. The system control unit 105 may reside in the central control room with a display 106 indicating system status of the HVAC system 100. The system control unit 105 may include a processor and communications interface 138 for controlling the HVAC system and communicating with the other HVAC system 100 components. The system control unit 105 is in operative communication with the air handler controller 110 over system communication bus 135, which communicates signals between the system control unit 105 and the air handler controller 110. As a result of the bi-directional flow of information between the system control unit 105 and the air handler controller 110, the algorithms described in exemplary embodiments may be implemented in either control unit 105 or controller 110. Also, in some embodiments, certain aspects of the algorithms may be implemented in control unit 105 while other aspects may be implemented in controller 110.

In addition, a user device 170 (in addition to the system controller) may communicate with the system 100 either via the system control unit 105, with the air handler controller 110, or directly to components and sensors such as the motor 115. The user device 170 may be any form of a mobile device (e.g., smart phone, smart watch, wearable technology, laptop, tablet, etc.). The user device 170 can include several types of devices, in one instance, even a fixed device, e.g. a keypad/touch screen affixed to a wall in a building corridor/lobby, and a user-owned device 170 such a smartphone. It should be appreciated that the first two (system control unit 105, with the air handler controller 110) are typically part of the system 100 infrastructure, while the third is typically owned and used by the service man, homeowner, and the like. The term "user device" 170 is used to denote all of these types of devices as may be employed by the user for the purposes of communication with the system 100. It should be appreciated that in some instances a user device 170 are proximate to the system 100, for example, a thermostat or system control unit 105, in others they are mobile.

The user device 170 may include a mobile and/or personal device that is typically carried by a person, such as a phone, PDA, etc. The user device 170 may include a processor, memory, and communication module(s), as needed to facilitate operation and interfacing with the system 100. As described below, the processor can be any type or combination of computer processors, such as a microprocessor, microcontroller, digital signal processor, application specific integrated circuit, programmable logic device, and/or field programmable gate array. The memory can be a non-transitory computer readable storage medium tangibly embodied in the user device 170 including executable instructions stored therein, for instance, as firmware. The communication module may implement one or more communication protocols as described in further detail herein, and may include features to enable wired or wireless communication with external and/or remote devices separate from the user device 170. The user device 170 may further include a user interface 172 (e.g., a display screen, a microphone, speakers, input elements such as a keyboard or touch screen, etc.) as known in the art.

The user device 170, as well as other components of the system 100 including system control unit 105, with the air handler controller 110, and motor 115 can communicate with one another, in accordance with the embodiments of the present disclosure, e.g., as shown in FIG. 1. For example, one or more user devices 170 and the air handler controller 110 or system control unit 105 may communicate with one another when proximate to one another (e.g., within a threshold distance). The user device 170 and any or all of system control unit 105, with the air handler controller 110, and motor 115 may communicate over one or more networks 135, (e.g., communication bus 135) that may be wired or wireless. Wireless communication networks 135 can include, but are not limited to, Wi-Fi, short-range radio (e.g., Bluetooth®), near-field infrared, cellular network, etc. In some embodiments, the system control unit 105 or air handler controller 110 may include, or be associated with (e.g., communicatively coupled to) one or more other networked building elements (not shown), such as computers, beacons, other system controllers, bridges, routers, network nodes, etc. The networked element may also communicate directly or indirectly with the user devices 170 using one or more communication protocols or standards (e.g., through the network 175). For example, the networked element may communicate with the user device 170 using near-field communications (NFC) and thus enable communication between the user device 170 and the system control unit 105 or any other components in the system 100. The network 135 may be any type of known communication network including, but not limited to, a wide area network (WAN), a local area network (LAN), a global network (e.g. Internet), a virtual private network (VPN), a cloud network, and an intranet. The network 135 may be implemented using a wireless network or any kind of physical network implementation known in the art. The user devices 170 and/or the networked devices may be coupled to the system control unit 105, the air handler controller 110, and/or motor 115 through multiple networks 135 (e.g., cellular and Internet) so that not all user devices 170 and/or the networked devices are coupled to the any given controller or component 105, 110, 115 through the same network 135. One or more of the user devices 170 and the system control unit 105 may be connected to the network 135 in a wireless fashion. In one non-limiting embodiment, the network 135 is the Internet and one or more of the user devices 170 execute a user interface application (e.g. a web browser, mobile app) to contact the including system control unit 105, the air handler controller 110, and/or motor 115 through the network 135.

In one embodiment, the user device 170 includes a computing system having a computer program stored on nonvolatile memory to execute instructions via a microprocessor related to aspects of an air flow computations associated with the blower 120 and motor 115 in HVAC system 100. Also, the user device 170 includes a user input element 172 by which a user/installer may change the desired operating characteristics of the HVAC system 100, such as torque commands, air flow requirements and the like. The user may also enter certain specific aspects of the air handler 102 installation such as, for example, the local altitude for operation of the air handler 102, which may be used in the various algorithms. It is to be appreciated that the system control unit 105 implements aspects of an air circulation and filtration control algorithm for determining the operating parameters to provide an optimized operation while ensuring the desired IAQ is maintained. System operating parameters include, but are not limited to air volume flow rate or air mass flow rate, the blower 120 power consumption, and duct static pressure/duct total pressure, differential pressure across the filter media over the operating range of the motor 115, $CO_2$ concentration, VOC concentration and particulate matter concentration. Moreover, while some system parameters may be measured, others may be calculated or inferred. Further, it should be appreciated that while aspects of the algorithms described may be executed in the system control unit 105, in other embodiments, any of the above algorithms may also be executed in the air handler controller 110, or elsewhere without departing from the scope of the described embodiments.

The HVAC system 100 includes an air handler controller 110 operably connected to the blower system 130 for transmitting torque commands to the blower system 130. The air handler controller 110 includes a processor 112 and memory, which stores operational characteristics of blower system 130 that are specific to the air handler unit model being used. The operational characteristics may include blower diameter and blower operating torque. In one embodiment, air handler controller 110 transmits, over the motor communication bus 136, operation requests to the variable speed motor 115 in the form of a torque command, and receives operating speed of the motor 115 via the motor communication bus 136. It should be appreciated that the motor communication bus 136 may be the same as network 135. In addition, the user device 170 may also be directly connected to the motor communication bus 136 as may be understood in the art. The variable speed motor 115 receives operational torque commands from the air handler controller 110 directing the blower 120 to operate at the commanded motor operating torque.

In operation, of the HVAC system 100, the system control unit 105 communicates to the air handler controller 110 a command for a desired indoor air flow. The desired indoor air flow depends on user settings such as, for example, the current operating mode, such as heating, cooling, dehumidification, humidification, circulation fan, outside fresh air intake etc., the number of stages of heating or cooling, and other factors. In some other operating modes, such as gas heating or electric heating, the system control unit 105 commands the stages of heat and the air handler controller 110 determines the corresponding desired indoor air flow.

Also, the air handler controller 110 is in direct communication with the blower system 130 over motor communication bus 136, which serves to transmit torque commands from the air handler controller 110 to the blower system 130 and receive operation feedback from the blower system 130 such as, for example, the operating speed of the motor 115.

In operation, for every air handler unit 102 model, the air handler controller 110 may stores a full set of characteristic constants used by various control algorithms for the HVAC system 100. In some instances, these characteristic constants are pre-determined for each air handler 102 model by characterizing tests run during the product development process for each model. Also, during the manufacturing process, the information about the specific air handler unit 102 model is also stored in the memory of the air handler controller unit 110. With field replacements, in some instances, the service technician may need to enter the specific air handler unit 102 model information into the system control unit 105. The system control unit 105 then communicates the specific air handler 102 model information to the air handler controller 110. Knowing the specific air handler unit 102 model, the air handler controller 110 looks up the specific characteristic constants applicable to the model from the list of constants for all possible models stored in its memory. These characteristic constants can then be used in the execution of the algorithms that are employed to control the HVAC system 100 and more closely match selectable performance characteristics of one given component e.g., the air handler 102 to other components in the installed HVAC system 100.

In operation, of the HVAC system 100, to satisfy a user or system call for heat or cooling, the air hander 102 needs to operate the blower 120. To accomplish this the blower motor is activated to exchange air in the conditioned space. The air handler controller 110 sends a torque command to the blower motor 115 over the motor communication bus 136. The motor operates the blower at the commanded torque to achieve the desired air flow. However, once installed, based on given ductwork restrictions, filters becoming contaminated, or even replaced components, sometimes the commanded torque may not achieve the expected airflow. Increasing the airflow may require increasing the torque commanded to the blower motor which in turn requires additional energy. The described methodology provides a scheme for achieving the desired operation of the HVAC system 100 (e.g. temperature, humidity control) while effectively reducing overall operating costs by balancing expenses against desired operational parameters.

Continuing with FIG. 1, in an embodiment, the air circulation system such as HVAC system 100 may include an air filtration subsystem 140. The air filtration system 140 may be part of or operably connected with the air handler 102 as part of the system 100. The filtration system 140 is also coupled with ductwork 125 and includes and an interface to bring in outside air to the building space. Outside air is typically mixed with conditioned air in a building space to maintain acceptable $CO_2$ levels. A damper or valve 142 is used to permit the addition of outside air. The damper 142 is operably connected to one or more of the controllers, that is, system controller 105 or the air handler controller 110 and the user device 170. The interconnection, whether wired or wirelessly via a communication interface as depicted by reference letter A. This communication interface can be the same or in addition to that described earlier as 135 (as shown). In an embodiment a fan or blower 144 with a fan motor controller 146 may be employed to pull in outside air to the conditioned space served by ductwork 125. The damper 142 and the fan 144 may be operably in communication to act in concert. In an embodiment, the controllers may elect to bring in outside air as needed to maintain indoor air quality. However the cost of bringing in outside air can be balanced against the impacts of doing so. Adding outside air requires heating or cooling. It may also require additional contaminate filtering. As such, in some embodiments, it may also be desirable to avoid bringing outside air, or delay doing so to reduce or minimize the cost impact. Also included in an embodiment of the air filtration system 140 is an air filter 148 and differential pressure sensor 150 for measuring the pressure differential across the air filter 148. The air filter 148 may be a simple passive mechanical device, such as standard filters, membranes, and the like or may include active filtering devices such as electronic, electrostatic precipitators, ionic, as well as infrared and photoelectric type devices including any combination of the foregoing. In an embodiment, the air filter 148 also may also be staged. That is, with a lower efficiency (coarse) filter and higher efficiency filter or a combination of electrically enhanced filter and a high efficiency mechanical filter. While the embodiments described herein are primarily directed to application and optimization based on operation and maintenance practices associated with the use of mechanical filters, it will be appreciated that they may also be applied to applications with other filter types.

In an embodiment, the air filtration system 102 also includes a particulate matter (PM) detector 160 as may also be employed for detection of particulate matter (or particulate matter concentration) in the air being supplied to the conditioned space. Particulate matter sensors may include any variety of types includes ionizing detectors, LED or laser based photoelectric sensors, or generally purpose smoke detectors, and the like. In an embodiment one or more PM sensors 160 can be placed upstream and downstream of filter 148 to monitor how effectively the filtration system functions. In other embodiments it need only be placed downstream. In some embodiments it may also be desirable to place a particulate matter sensor to detect the particulate concentration of incoming air. Along with air flow sensor 162 or the air flow rates derived from pressure drop, filtered air delivery rate can be computed and used for determining the input for the operating algorithm that optimize air delivery and operating and maintenance costs. Filtered air delivery rate is computed as the multiplication of filter efficiency and air flow rate. Particulate matter (PM), particularly PM 2.5 (PM size<2.5 microns) has significant harmful effects on the health of building occupants. In developing countries (e.g., China, India), these harmful effects have promoted substantial demands for cost effective air purification techniques and products. However, indoor air quality (IAQ) in many commercial buildings has still been lagging because the operation of those properties is constrained by energy consumption and maintenance costs.

In addition to the particulate matter detector 160 in some embodiments, an optional air flow sensor 162 may be placed in the airstream of the ductwork 125 to measure the actual airflow provided. In an embodiment, the airflow sensor may be a thermal conductivity flow sensor, optical flow sensor, electromagnetic flow sensor, ultrasonic flow sensor, rotometer type sensor relying on movement of an airfoil to determine flow, differential pressure type flow sensor, or any suitable flow monitoring device. Measuring the actual airflow allows filtration system performance to be computed in order to operate the AHU as desired or as optimized. In some embodiments, airflow may be alternatively inferred or deduced from other operating conditions of the air filtration system 140 and HVAC system 100. For example, in some embodiments, airflow can be inferred for a known air handler 102 based on a known operational torque or power consumption, and motor speed as described above. Many manufacturers employ proprietary algorithms, look up tables and the like correlating torque, motor speed and airflow for given system components.

As described earlier, various system operating parameters include, but are not limited to air volume flow rate or air mass flow rate, the blower 120 power consumption, and duct static pressure/duct total pressure, differential pressure across the contaminate filter 148 over the operating range of the motor 115, $CO_2$ concentration, VOC concentration, and particulate matter concentration. Moreover, while some system parameters may be measured, others may be calculated or inferred. For example, if the total pressure and airflow are measured, the pressure drop in the contaminate filter 148 and even the electricity consumption in the blower motor 120 may be computed based on these measured parameters and some initial information. In another example, knowledge of the electricity consumption in the blower motor 120 together with airflow information permits inferring information about the status of the contaminate filter 148.

In another embodiment, in some applications, an optional $CO_2$ sensor 168 may be employed to detect $CO_2$ concentrations in the building space. In many systems outside air is brought into the building to ensure that $CO_2$ levels are maintained below a selected threshold or limits defined by regulations. However adding outside air impacts the cost of operating the circulation system 140. In an embodiment, conventional $CO_2$ detectors may be employed, for example they may include non-dispersive infra-red (NDIR) $CO_2$ sensors, electrochemical $CO_2$ sensors, or photoacoustic $CO_2$ sensors, and the like.

Figure 2:
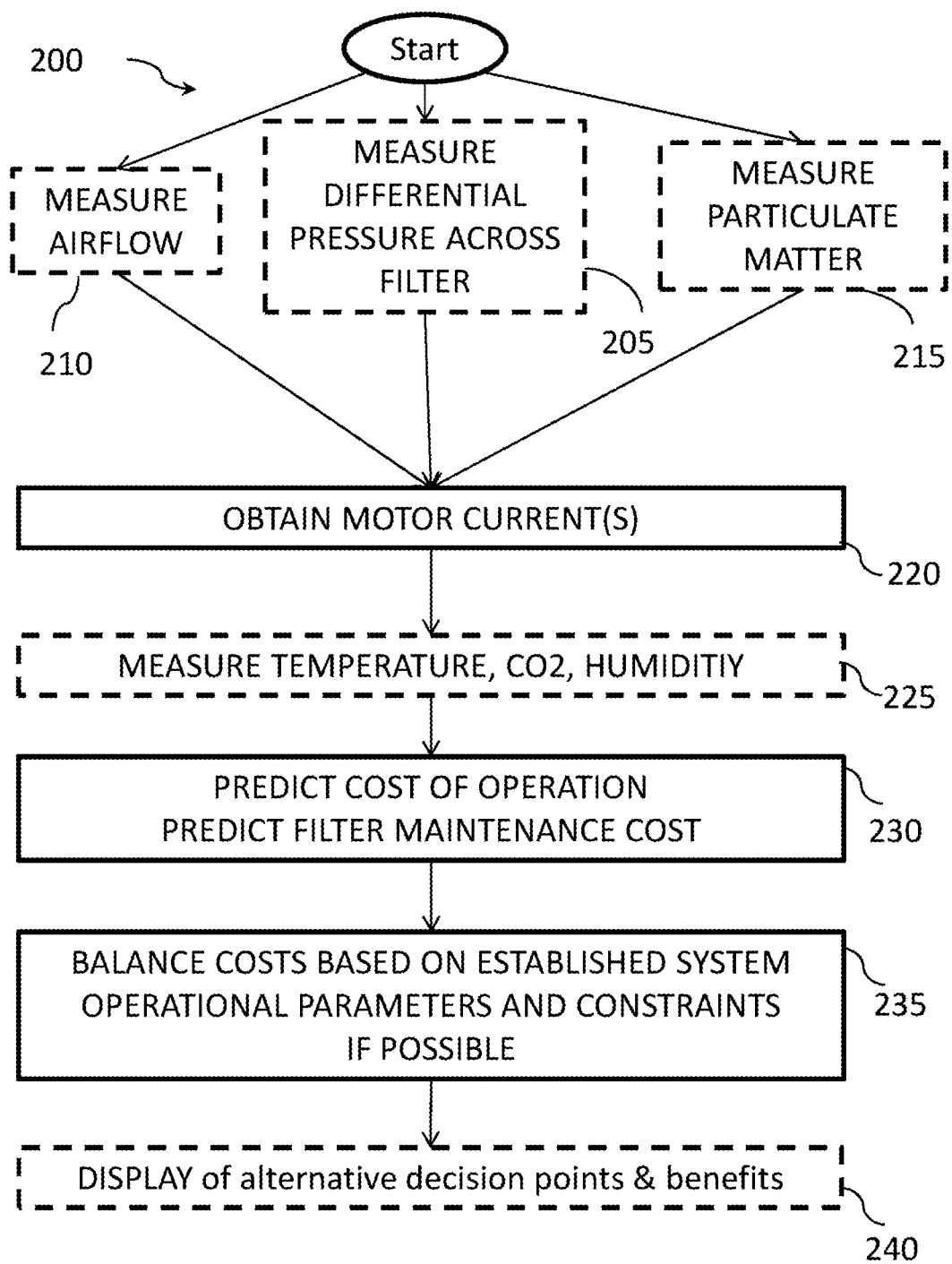
FIG. 2 is a flow diagram illustrating a method for enhancing energy use optimization in an air circulation system for a heating, ventilation, and cooling (HVAC) system in accordance with an embodiment.

Turning now to FIG. 2 as well, a flow chart of the method 200 for enhancing the operation economy and optimizing the efficiency of an air filtration system 140 in accordance with an embodiment is depicted. The method 200 is directed toward operating the air filtration system 140 in a manner that takes advantage of various sensor inputs to obtain information on how well the air filtration system 140 of the HVAC system 100 is operating to balance against the costs of operation and energy consumption against costs to conduct maintenance (e.g. clean and/or replace filters and the like). In one embodiment the method is executed on a user device, or the system controller 105. In some embodiments the user device may be a separate controller added to the HVAC system 100 for implementing the described methodology. Unfortunately in many commercial applications, property managers prefer limited maintenance and recirculating indoor air over bringing outdoor air to save the cost of filtering and conditioning the outside air. However, the practice of scheduled maintenance of the air filters would require regular visual inspections, which can limit the effectiveness of filtering system. In some circumstances inadequate inspections and maintenance can lead to clogged filters, dirty, overburdened cleaners and as a result lose clean air delivery effectiveness while driving operating costs up as fans and blowers consume excess energy trying to overcome the clogged devices.

In an embodiment, as depicted at process step 205 energy consumption and standard operation costs associated with operating the air filtration system 102 including, but not limited to the cost to operate the blower 120 and or the cost to operate the contaminate filter 148 (for electrostatics and the like) is calculated in effectively in real time. The cost can be normalized by filtered air delivery rate such that the cost of drawing per amount of outside air can be communicated to system operator, system controller and provide additional diagnostics of the entire AHU. In addition cost of maintenance based on at least one of, among others, the pressure drop across the filter 148 as measured by the differential pressure sensor 150 and air flow rate as measured by the flow sensor 165, cost to replace or clean filters, labor and the like is computed and then compared. That is, the described method 200 balances increasing cost of energy over time against decreasing effectiveness of clean air delivery by the air filtration system 140 over the same operational duration based on HVAC system operational parameters and constraints to provide an optimal system operation point and duration for conducting maintenance. In an embodiment, a system request for the demand of bringing in outside air is made. The addition of outside air helps maintain acceptable CO2 concentrations, but also is part of the overall system control for comfort control.

In another embodiment, either the pressure drop across the filter 148 as measured by the differential pressure sensor 150 as shown at 205 or optionally the airflow rate as measured by the flow sensor 165 is employed as depicted at process step 210. Alternatively, as shown at optional process step 215 and 225, additional factors that may be considered or addressed are the measure of particulate matter in the air, temperature, or temperature differential between inside air and outside air, and the CO2 concentration. In particular, the particulate matter measurement from the particulate sensor 160 with the airflow as measured from the airflow sensor 165 permits the algorithms to predict the performance of the filter 148 to ascertain the effectiveness of the air filter 148 and air filtration system 102 as shown as process step 215. The consumption of energy may be based on at least the current draw in the fan motor 115 and/or the fan motor 144 while it is employed to pull in outside air. In an embodiment, the motor current is measured with current sensors as depicted at process step 220. In some embodiments, the motor current is derived at the controllers e.g., 110 and/or 146 from the commands to the motor 115, 144 respectively. In another embodiment, the motor current is communicated to the controllers 110 and/or 105 via the communication interfaces 135, 136. In another embodiment, the consumption of energy may be inferred from the measurement of the pressure drop across the air filter 148 by the differential pressure sensor 150. If the pressure vs flow fan curve is known (as may be ascertained a priori by test methods when the equipment is designed or manufactured), as well as the efficiency of the fan/blower, the added power demand due to a clogged filter can be calculated along with flow and pressure drop measurements.

In one embodiment, a consumption and reduction in operating efficiency is determined as shown at process step 230 which is then weighed against predicted maintenance costs and factors including, but not limited to, maintenance cost of filters, i.e., labor and material cost for filter replacement, and energy consumption to satisfy pre-set economic constraints. These costs are then balanced to determine an efficient operation point for the system and a target maintenance interval if achievable as shown at step 235. In some instances, it may not be possible to achieve an optimal or practical balance of maintenance intervals and operational costs. In this instance optionally alternative selections and constraints may be employed. Alternatively, replacement of mechanical filters 148 may be governed by combined OA intake requirements, filter cost, and energy cost projected over a period of time. In one embodiment a visualization of overall IAQ, energy consumption, filter efficiency, and the like, can be made available for viewing on the display 105 of the system controller 105 and/or on the user device 170 while the filtration system operates autonomously as shown at optional process step 245. In an embodiment a user/building owner can adjust the parameters and constraints associated with the optimization and observe the impact on costs, HVAC system operation, energy consumption, and the like. For example, a user/building owner may elect to extend the duration between air filter 148 replacements when the demand of outside air intake is relatively low although the filter already becomes less energy efficient. While such a choice reduces the costs expended for materials, and reduces the labor costs, other operating costs such as electricity required by the motors increases as the motors 115, 144 expend additional energy to maintain airflow through filters having a larger buildup of contamination. Therefore, when increased OA intake is anticipated, filter replacement or cleaning can be scheduled in advance. In another example, a building owner may elect forego limits on IAQ, e.g., $CO_2$ concentration to limit exchange with outside air. Building owners, may be able to save on expenses by exceeding permitted $CO_2$ concentrations when the building is not occupied such as evenings or weekends. This approach can save costs by limiting operation of the motor 144, by limiting the need to condition the newly added air to the space.

Figure 3:
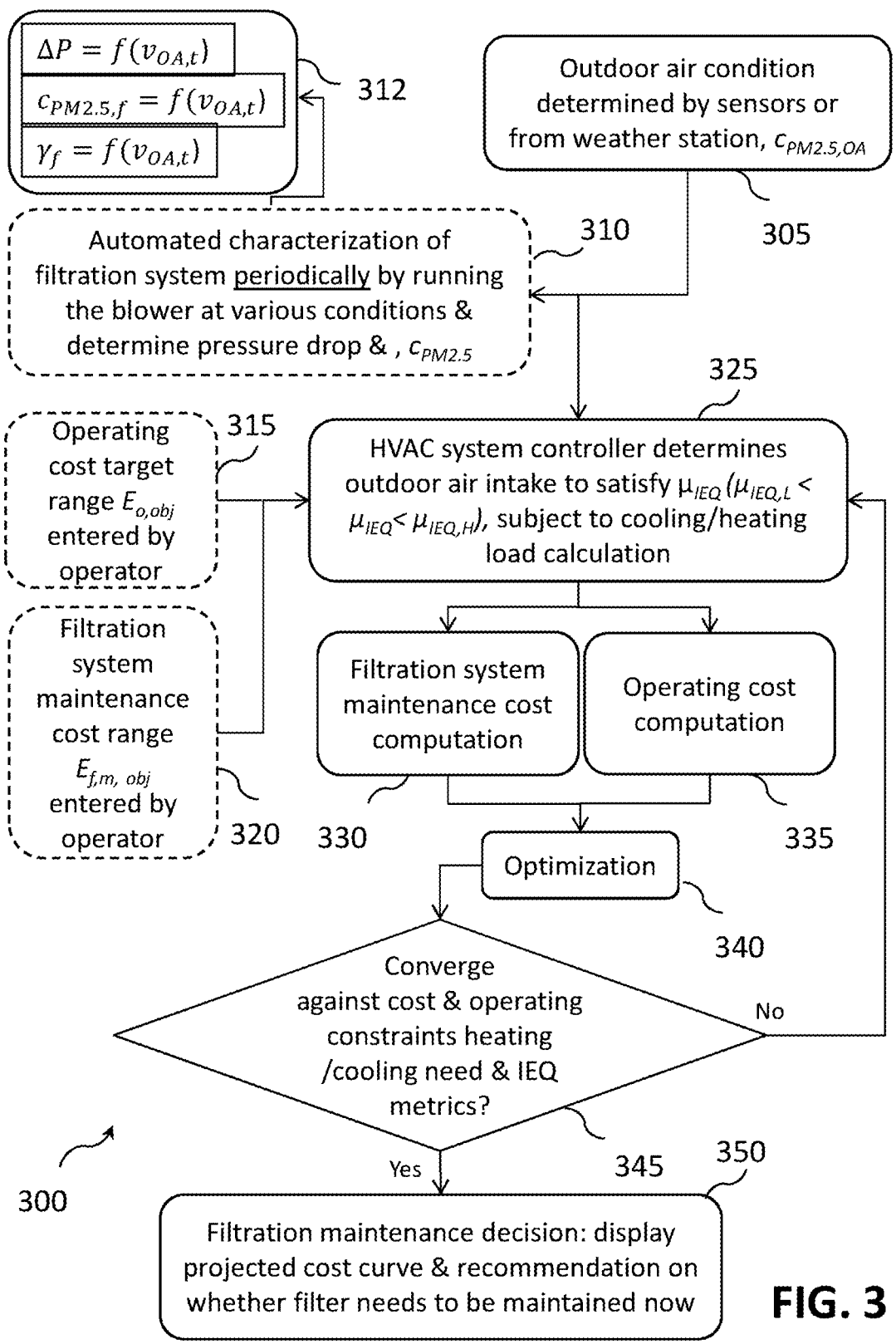
FIG. 3 depicts a detailed description of the method for enhancing the operation economy and optimizing the effectiveness of an air circulation system in accordance with an embodiment.

Turning now to FIG. 3 where a detailed depiction and example of the method 300 for enhancing the operation economy and optimizing the efficiency of an air filtration system 140 in accordance with an embodiment is depicted. In this example depicted and shown generally, as 300 further detail is provided for understanding the methodology. In an embodiment at process step 305 the condition of the outside air is evaluated. In this instance, that condition corresponds to the concentration of particulate matter below 2.5 microns. A characterization or evaluation of the current state of the filtration system may be completed as depicted at process step 310. In this example, an evaluation of the current state of the filter media 148 based on other system parameters such as the efficacy of the contaminant filter 148 based on current airflow, pressure drop, time in operation, particulate matter in the current filtered air, and particulate matter in the incoming outside air as shown at 312. It will be appreciated that as the system operates and as airflow and particulate matter concentrations increase, the contaminant filter 148 media will accumulate debris and clog. As the filter 148 becomes increasingly clogged, the blower 130 workload and current draw increases to maintain the desired airflow.

Figure 4:
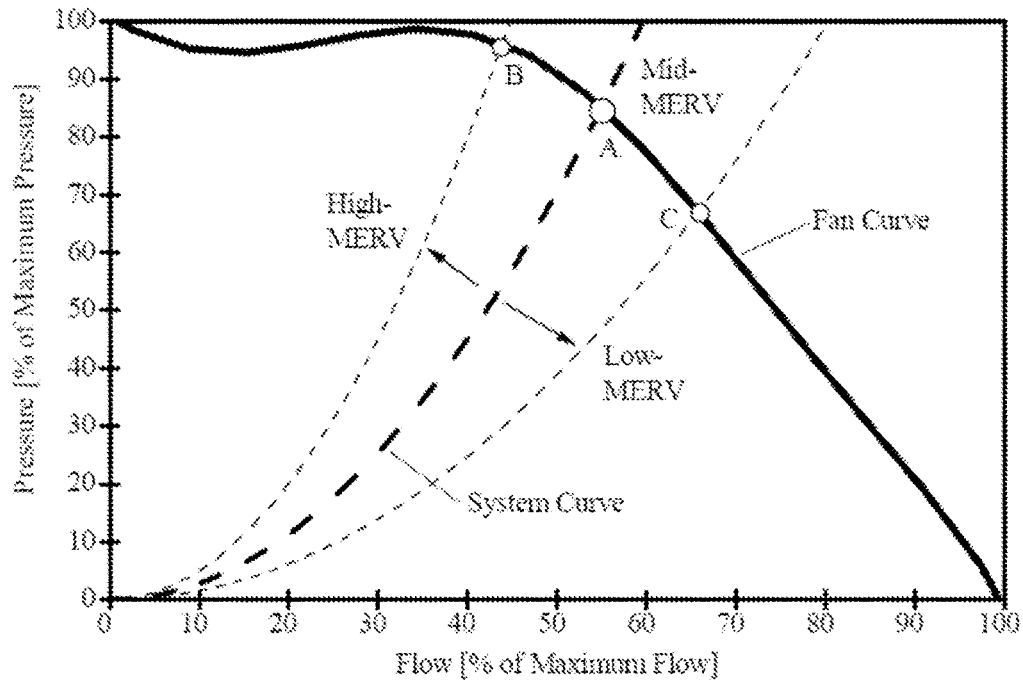
FIG. 4 depicts an example of the characterization of the system and the balance desired between airflow and pressure drop across the particulate contaminant filter in accordance with an embodiment.

FIG. 4 depicts an example of the characterization of the system and the relationship between airflow and pressure drop across the contaminant filter 148. As depicted in the graph, the system operation can be characterized with a choice or trade-off between higher airflow, with less filtration by the contaminant filter 148 and lower airflow and better filtration. Differing filters of different efficiencies exhibit differing pressure drops, with the lower-efficiency (MERV) filter typically having a lower pressure drop. Mechanical air filters will not typically improve in performance a lower speeds. Electret filters, that is, electrically-enhanced air filters, and electrostatic precipitators can exhibit improved collection efficiency at lower airflows, but, that effect is typically quite limited. Therefore the selection of the filter media, its efficiency, and operation duration are all factors to be considered in the cost of operating a system. In an embodiment, the methodologies disclosed provide an optimization between the desired airflows, pressure drop, filtration, maintenance and operational costs over a selected duration of time all while maintaining a desired indoor air quality. The acronym MERV stands for "Minimum Efficiency Reporting Value" and is defined by ASHRAE Standard 52.2. The MERV rating is the standard method for comparing the efficiency of an air filter in North America. The higher the MERV rating, the better the filter is at removing particles from the air. The MERV scale ranges from 1 (least efficient) to 16 (most efficient), and measures a filter's ability remove particles from 3 to 10 microns in size. Filters with higher ratings not only remove more particles from the air, they also remove smaller particles. For example a typical fiberglass furnace filter might be rated from 1 to 4 on the MERV scale, while a highly efficient HVAC filter would be rated a 16. However, as stated earlier, as the filtration improves, so too does the workload on the blower to maintain the desired airflow.

As stated previously, an operator may establish cost constraints and operational cost targets for the HVAC system. For example, planned budgets for the system, planned energy expenditures, while also establishing the constraints desired for maintenance costs, based on media costs, labor and the like. As depicted at process steps 315 and 320. Using these constraints the method continues at process step 325 where the controller determines operational requirements/constraints. For example subject to satisfying operational heating and cooling requirements, the required outdoor air intake and then its impact on indoor air quality is evaluated.

For example, in an embodiment, indoor environment quality metrics: $\mu_{IEQ}$ may be established as a weighted average of normalized contributors that impact indoor air quality which can be computed as shown in Equation 1:

$$\mu_{IEQ} = w_1 \frac{c_{CO2,i}}{c_{CO2,n}} + w_1 \frac{c_{PM2.5,iA}}{c_{PM2.5,n}} + w_1 \frac{c_{VOC,i}}{c_{VOC,n}} + \ldots \quad (1)$$

where: the indoor $CO_2$ concentration is $c_{CO2,iA}$ and $c_{CO2,n}$ is a normalization parameter for indoor $CO_2$ concentration; while $c_{PM2.5,iA}$ is the indoor particulate matter concentration and $c_{PM2.5,n}$ is a normalization parameter for indoor particulate matter concentration; while $c_{VOC,iA}$ is the indoor total volatile organic compounds concentration and $c_{VOC,n}$ is a normalization parameter for indoor VOC concentration and $w_i$ is a weighting factor for each term of air pollutants contributing to the overall indoor air quality determination. The normalization parameters operate to make the terms unitless, and scaled relative to a selected level or operational norm.

Moreover, in an embodiment the operating cost $E_{o,t}$ over period of t can be computed as a summation over the time duration of the various costs impacting the system. For example, the costs associated with system maintenance are computed as depicted at process step 330, while the operational costs for operating the system including operating the fan, cost for pulling in outside air, and the like are computed at process step 335. Other exemplary costs may include the costs of bringing in outside air including, but not limited to, fan energy to deliver outside air through ductwork, filters, and any heat/energy recovery device; cost to heat or cool the outside air to the desired indoor temperature; and the cost to humidify or dehumidify the air to the desired humidity. Another example cost may include the cost associated with filter change-out and maintenance, and the cost of maintaining the heat/energy recovery device (ERV or HRV core). For example:

$$E_{o,t} = \Sigma_0^t v_{OA,d} \times E_{elc} \quad (2)$$

Where $v_{OA,d}$ is the outside airflow demanded by AHU central controller and $E_{elc}$ is the electricity cost per unit air amount.

Filter maintenance cost over period of t: $E_{f,m}$, can be estimated from amortized labor cost and filter material costs based on historical data, that likely correlate well with seasonal pollution severity.

$$E_{f,m} = \Sigma_0^t E_{f,labor} + E_{f,materials} \quad (3)$$

Where $E_{f,labor}$ is the cost associated with the labor to replace filters while $E_{f,materials}$ is the cost of filters over a duration of time. The objective operating cost and filtration system maintenance cost are denoted by $E_{o,obj}$ and $E_{f,m,obj}$ respectively. These values are established by a user or system operator as targets for the system and optimization.

Turing now to the operation of the algorithms for balancing and optimizing the costs as depicted at process block 340, the efficiency of the contaminant filter 148 can be computed as the ratio of the particulate matter concentration in the indoor filtered air to that of the outdoor air. Although particle concentrations can be measured and reported in many ways, the value of $PM_{2.5}$ (representing the mass per cubic meter of particulates 2.5 μm and smaller) will be used for example in the remainder of this text. The use of $PM_{2.5}$ in the following examples does not preclude the use of other concentration measures in the practice of the claimed art. The efficiency of the contaminant filter can thus be expressed as:

$$\gamma_f = \frac{c_{PM2.5,IA}}{c_{PM2.5,OA}} \quad (4)$$

where $c_{PM2.5,OA}$ is the outdoor particulate matter concentration and $c_{PM2.5,IA}$ is the indoor particulate matter concentration. While the particulate matter concentration for the indoor air may be computed as:

$$c_{PM2.5,iA} = \frac{v_{iA,r} \times c_{PM2.5,iA} + v_{OA,t} \times c_{PM2.5,f}}{v_{iA,r} + v_{OA,t}} \ldots \quad (5)$$

where $v_{iA,r}$ is the recirculated indoor air volumetric flow rate (in units of cubic foot per minute or meters cubed per second for example), $c_{PM2.5,iA}$ is the indoor air particulate concentration and $v_{OA,t}$ is the outdoor air intake volumetric flow rate, while the particulate matter concentration in filtered outdoor air is denoted as $c_{PM2.5,f}$.

Likewise, indoor air $CO_2$ concentration may be computed as:

$$c_{CO_2,iA} = \frac{v_{iA,r} \times c_{CO_2,iA} + v_{OA,t} \times c_{CO_2,oA}}{v_{iA,r} + v_{OA,t}} \quad (6)$$

where $v_{iA,r}$ is the recirculated indoor air volumetric flow rate, the indoor $CO_2$ concentration is $c_{CO2,iA}$ and the outdoor air $CO_2$ concentration is $c_{CO2,OA}$ and $v_{OA,t}$ is the outdoor air intake volumetric flow rate, and outdoor air $CO_2$ concentration is $c_{CO2,OA}$ Moreover, the is the indoor total volatile organic compounds concentration $c_{VOC,iA}$ may be computed as $$c_{VOC,iA} = \frac{v_{iA,r} \times c_{VOC,iA}}{v_{iA,r} + v_{OA,t}} \quad (7)$$

where once again $v_{iA,r}$ is the recirculated indoor air volumetric flow rate, the indoor volatile organic compound concentration is $c_{VOC,iA}$ and $v_{OA,t}$ is the outdoor air intake volumetric flow rate. It should be noted that as most VOCs are generated in the indoor space, the contribution from outside air is omitted for simplicity. In some environments, if this were not the case an outdoor air contribution to the indoor air concentration could be considered.

Continuing now with FIG. 3, the controller as part of the methodology 300 executes an optimization program at process block 340. The optimization based in one example on Equations (1)-(7) seek to provide a solution balancing the costs of maintenance versus the costs of operating from process blocks 330 and 335 while adhering to the constraints set by the operator from process block 315 and 320 to achieve satisfying the cooling/heating load and achieving the desired indoor air quality. If the optimization is successful the algorithms will converge on a solution that balances all the costs and constraints to yield a most cost effective solution that includes a proposed maintenance level/routine for the duration that the operator has set as shown at process block 345. The proposed solution may then be presented to the operator for scheduling and modification as the operator elects as depicted as shown at process block 350. Otherwise, it may be possible that a solution is not achievable (e.g., constraints are too tight, proposed energy budget selected to be too low and the like) the process reiterates for the operator to enter revised constraints and system operational requirements. It should be appreciated that it should be expected that the process may require numerous iterations to complete. Operators may always end up selecting constraints that are too tight in order to minimize operational and maintenance costs. To facilitate the operator setting such constraints and requirements, the algorithms may also display proposed adjustments to the constraints such as operating cost range and maintenance cost range as depicted in process blocks 315 and 320. Moreover, the system may also propose additional alternatives that may assist the optimization to converge. For example, relaxing some of the factors for indoor air quality, modifications to operational modes, and the like.

The technical effects and benefits of embodiments relate to an HVAC system include an air handler control unit for implementing an internal compensation algorithm to determine operating parameters for an air handler system 102. The algorithm is used to determine the air handler system 102 operating parameters of indoor air flow volume, indoor air mass flow, differential pressure across a filter, particulate matter, and blower motor power consumption, including consumption at altitudes to determine a desired operating point for the system. A smart filtration system allows for energy consumption optimization while maintaining high quality IAQ. It also reduces maintenance burden resulting from manual inspection and extending useful lifetime of particle filters. In addition it enables the optimization of overall operation of air side products and provides visualization to users/property managers. The described embodiments may be impended on user devices enabled by algorithms are made as modules to be used in existing AHUs or new equipment.

The terminology used herein is for the purpose of describing particular embodiments only and is not intended to be limiting of scope and breadth of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to described embodiments in the form disclosed. Many modifications and variations will be apparent to those of ordinary skill in the art without departing from the scope and spirit of the claims. The embodiments have been chosen and described in order to best explain the principles of the inventive concept and the practical application, and to enable others of ordinary skill in the art to understand the scope and breadth of the claims and the various embodiments with various modifications as are suited to the particular use contemplated.

What is claimed is:

1. A system for enhancing the operation of an air circulation system in a building, comprising:
    an air handler including an indoor blower and a motor operably coupled to a duct network, the blower configured to impart airflow to the air in the duct network;
    a contamination filter operably coupled to the duct network configured to remove contamination from air in the duct network;
    at least one of a differential pressure sensor configured to measure a differential pressure across the contamination filter, a pressure sensor configured to measure a pressure in the duct network, a particulate concentration sensor configured to determine the presence of particulates in the air in the duct network after the contamination filter, an airflow sensor configured to measure airflow in the duct network;
    an air handler controller in operable communication with at least the motor, the air handler controller configured to provide control commands to operate the motor;
    a controller in operable communication with the air handler controller and at least one of the differential pressure sensor, the pressure sensor, the particulate concentration sensor, and an airflow sensor, the controller configured to execute a method for enhancing the operation and improving the efficiency of an air circulation system in a building, comprising:
    predicting a cost of operation of the circulation system over an operational duration based on at least an electricity consumption associated with operation of the motor and an operational cost to operate the contamination filter;
    predicting a cost of maintenance of the circulation system over the operational duration based on at least one of, an operational condition of the contamination filter, a cost of a replacement contamination filter, a cost of labor to clean or replace the contamination filter, and an effectiveness of the contamination filter over the operational duration; and
    balancing the cost of operation of the circulation system versus the cost of maintenance of the circulation system over the selected operational duration to recommend at least one of a contamination filter use or bypass schedule, a contamination filter maintenance schedule, and a fresh air input schedule satisfying an operation objective and an operational constraint set by an operator.

2. The system of claim 1, wherein at least one of the electricity consumption and the operation condition of the contamination filter is based on one or more of a measured or computed electricity consumption of the motor to produce an airflow in the system, a measured or computed electricity consumption of the contamination filter, a total pressure experienced by the motor, a differential pressure across the contamination filter, a particulate matter concentration of the air in the circulation system, and the airflow through the contamination filter.

3. The system of claim 2, wherein the electricity consumption associated with operation of the motor is at least one of a change in consumption over the operational duration and the airflow is an airflow change over the operational duration.

4. The system of claim 2, wherein the airflow is at least one of measured by an airflow sensor and determined based on a combination of predetermined measurements and a system operational characteristic.

5. The system of claim 4, wherein the airflow is identified by at least one of a signal provided by the motor, a look up table, and equation or formula, and previously established testing and empirical data for a given air handler configuration; and the operating characteristic is indicative of the speed of the motor.

6. The system of claim 1, wherein the current associated with the motor is at least one of measured by a controller, measured by a sensor, estimated in the controller, and communicated by the motor.

7. The system of claim 1, further including a damper and a second motor configured to a provide outdoor fresh air to the duct network, wherein the predicting a cost of operation of the circulation system over the operational duration further includes at least one of a cost of the electrical current to operate the second motor, the cost of the electrical current to operate the damper over the operational duration, and the cost to condition the outdoor fresh air.

8. The system of claim 1, wherein the balancing is based on weighted indoor air quality metrics.

9. The system of claim 1, further including a user device with a display, the user device configured to provide a visualization to a user or property owner of the building to facilitate modifying constraints on the balancing.

10. The system of claim 1, wherein the air circulation system further includes at least one of heating, ventilation, and cooling.

* * * * *